United States Patent [19]
Clopton

[11] Patent Number: 5,311,983
[45] Date of Patent: May 17, 1994

[54] CONVEYOR FRAME WITH DRIVE HOUSING

[75] Inventor: Robert T. Clopton, Magnolia, Ky.

[73] Assignee: Tekno, Inc., Cave City, Ky.

[21] Appl. No.: 32,617

[22] Filed: Mar. 17, 1993

Related U.S. Application Data

[63] Continuation-in-part of Ser. No. 968,584, Oct. 29, 1992.

[51] Int. Cl.$^5$ .............................................. B65G 21/00
[52] U.S. Cl. ............................. 198/860.1; 198/861.1
[58] Field of Search ............... 198/860.1, 860.2, 861.1, 198/861.2, 832, 841

[56] References Cited

U.S. PATENT DOCUMENTS

| | | | |
|---|---|---|---|
| 3,443,680 | 5/1969 | Brill | 198/861.2 X |
| 3,605,994 | 9/1971 | Parlette | 198/861.1 |
| 3,878,937 | 4/1975 | Glaser et al. | 198/860.1 X |
| 4,930,623 | 6/1990 | Johnson et al. | 198/860.1 X |
| 4,993,542 | 2/1991 | Nomura | 198/816 |
| 5,029,697 | 7/1991 | McMillan et al. | 198/860.1 X |

FOREIGN PATENT DOCUMENTS

| | | | |
|---|---|---|---|
| 0329832 | 8/1989 | European Pat. Off. | 198/860.1 |
| 3216410 | 9/1991 | Japan | 198/861.1 |
| 8901915 | 2/1991 | Netherlands | 198/860.1 |
| 8500081 | 9/1984 | World Int. Prop. O. | 198/861.1 |

*Primary Examiner*—James R. Bidwell
*Attorney, Agent, or Firm*—Camoriano & Smith

[57] ABSTRACT

A conveyor using roller chain to carry products has a drive housing which is in line with its modular frame and which can be removed by moving the drive housing vertically relative to the drive frame.

12 Claims, 9 Drawing Sheets

CONVEYOR FRAME WITH DRIVE HOUSING

BACKGROUND OF THE INVENTION

This application is a continuation-in-part of U.S. Pat. Application Ser. No. 07/968,584, filed Oct. 29, 1992. The present invention relates to conveyors, and, in particular, to conveyors which utilize a roller chain for carrying the articles to be conveyed.

It is known to use roller chains for conveying articles along a conveyor. However, there have been several shortcomings with these conveyors.

First, debris can fall into the chain from above, causing the rollers to jam and stop rotating, which greatly increases the friction and eliminates the benefits of using a roller chain.

Second, when articles that are being conveyed are stopped, an additional friction load is placed on the conveyor drive.

Third, the construction of a conveyor frame is usually quite expensive. A big part of the expense is that special guides must be constructed and mounted to the conveyor frame for guiding the articles to be conveyed.

Fourth, there has been no convenient way for attaching air hoses, wires, and other tubular-shaped items to the conveyor frame.

Fifth, it is often difficult to match up a drive to the conveyor frame, and guides typically must stop at the drive, so there is a space in which the articles are not guided.

Sixth, it is often difficult to remove drives for maintenance purposes. Most drives require clearance at the end of the conveyor, which conflicts with the frequent need to place the end of the conveyor up against another conveyor or piece of equipment.

SUMMARY OF THE INVENTION

The present invention solves many of the problems of the prior art. For example, the present invention provides a modular conveyor frame construction with guide slots into which inexpensive guides can easily be attached. The modular frame construction also provides convenient means for attaching air hoses, wires, and other tubular-shaped items to the frame.

The present invention also provides a clip which can be inserted between adjacent rollers of the roller chain in order to prevent debris from getting into the chain and jamming the rollers.

The present invention also provides a conveyor stop attachment which lifts the articles up off of the conveyor chain, thereby eliminating any load on the drive when articles are accumulated on the conveyor.

The conveyor stop attachment is made to hook directly onto the conveyor frame, which eliminates alignment problems between the attachment and the conveyor frame.

The present invention also provides a drive housing which is readily attached to the modular frame and which has an exterior shape that conforms to the modular frame.

The drive housing includes the guide slot, so the guide can extend to the end of the conveyor, and the drive housing is mounted on the conveyor frame in such a way that it can be removed by lifting it up vertically—requiring no clearance at the end of the conveyor.

The drive housing also includes an opening, which permits debris on the top of the chain to fall off the chain, without being wedged in the chain or housing.

DESCRIPTION OF THE PREFERRED EMBODIMENTS

The conveyor 10 of the present invention, as shown in the figures described above, includes a drive shaft 12, which connects together two parallel sets of drive sprockets 16. At the other end of the conveyor, there are two parallel sets of idler sprockets 14. The drive sprockets 16 on the left side of the conveyor are used to drive a left chain 18, and the drive sprockets 16 on the right side of the conveyor are used to drive a right chain 20.

The left and right chains 18, 20 run parallel to each other in parallel left and right frame portions 22, 24, respectively. The left and right frame portions are preferably modular extruded parts which can be fastened together to make the conveyor 10 any desired size. These modular extruded parts 22, 24 define an upper chamber 26, which receives the upper run of the chain 18 or 20, and a lower chamber 28, which receives the lower run of the chain.

The chains 18, 20 are available on the market and are sold under the name of Tsubaki Double Plus chain. The chains 18, 20 are made up of a plurality of links 21, with each link 21 made up of a forward large roller 30 flanked by two smaller rollers 34 connected together by a chain pin 27, a rear large roller 30 flanked by two smaller rollers 34 connected together by a chain pin 27, and a pair of inner side bars 29 connected to said forward rollers and rear rollers by means of the chain pins 27. The forward set of rollers 30,34 and rear set of rollers 30, 34 form the front and back ends of a rectangle, and the sides of the rectangle are formed by the inner side bars 29. The links 21 are connected together by outer side bars 31, which are fastened to the rear of one link and the front of the next adjacent link by means of the chain pins 27.

The lower chambers 28 of both frame portions 22, 24 are completely enclosed on the top, bottom, left and right sides. The upper chambers 26 are enclosed on the left and right sides and on the bottom, and are partially enclosed on the top, with only the large central roller 30 of the chain 18, 20 projecting above the top surface of the frame portions 22, 24 for contacting the pallet or other article to be conveyed. Both the upper and lower chambers 26, 28 provide raised rails 32 for supporting the smaller-sized rollers 34 in rolling engagement. As can be seen from the drawings, the left and right frame portions 22, 24 are mirror images of each other. To achieve the mirror images, identical extrusions are simply run in opposite directions.

Figure 2:
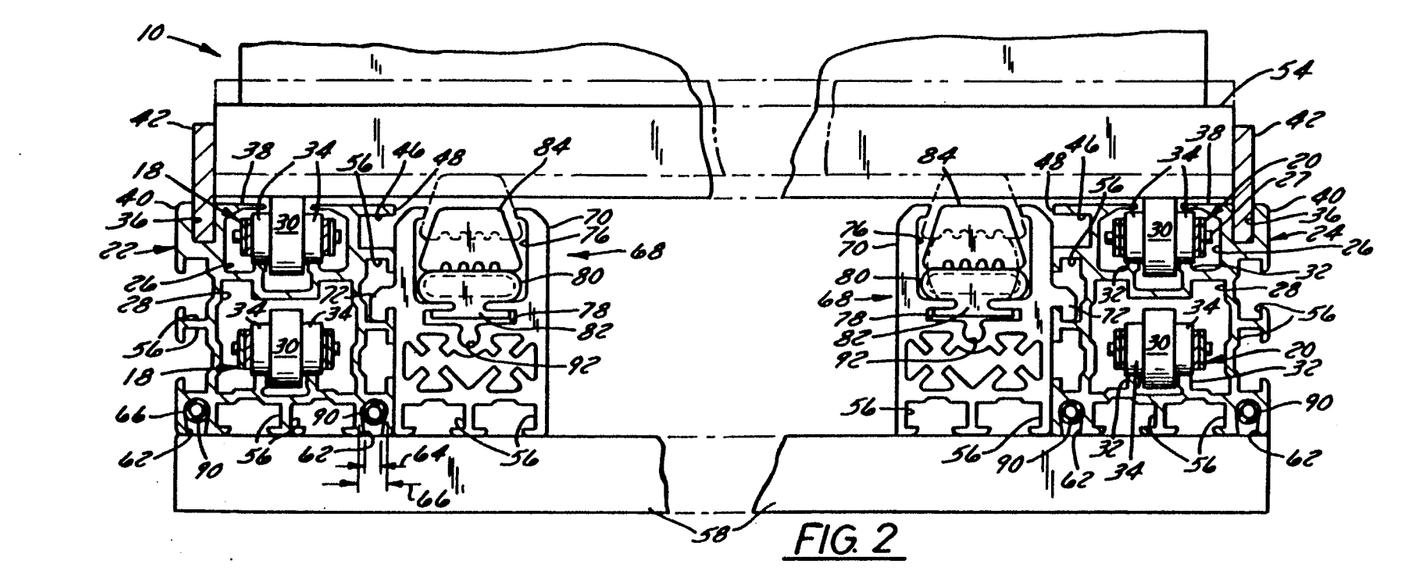
FIG. 2 is a sectional view taken along the section 2—2 of FIG. 1.
Figures 3, 10:
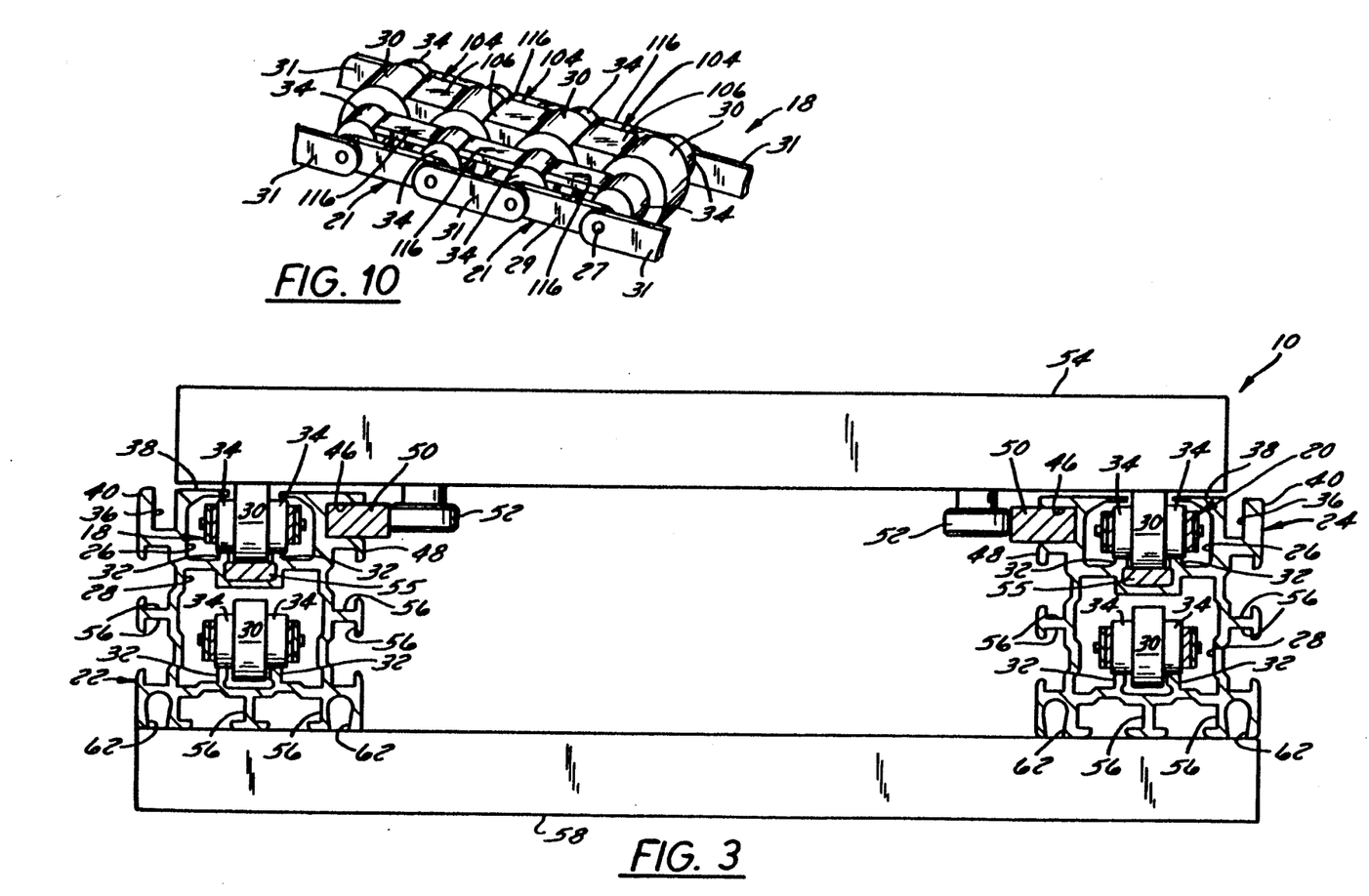
FIG. 3 is a sectional view of a portion of the conveyor of FIG. 1, with horizontal guides installed on the conveyor.
FIG. 10 is a perspective view of the chain shown in FIG. 8.

As is shown in FIGS. 2 and 3, the left and right frame members 22, 24 define a rectangular vertical slot 36 opening outward from their upper surface 38 adjacent their outside edge 40. The vertical slots 36 are taller than they are wide and are used to support guide rails 42. The height of the vertical slots is preferably at least two times the width. The width of the vertical slots 36 is preferably some standard size, such as $\frac{1}{4}"$, or $\frac{3}{8}"$ so that it can accept a standard, off-the-shelf piece of bar stock.

Unlike prior art designs, in which the guide rails must be specially made to bolt to the conveyor frame, these vertical slots can receive any available bar stock. For example, a $\frac{1}{4}"$-wide guide slot might receive a $\frac{1}{4}"0$ bar made of ultra high molecular weight polyethylene or steel. In this manner, guide rails 42 are simple, inexpensive, and can be placed in any location or locations along the conveyor as needed. In order to secure the guide rail on the frame, holes (not shown) may be drilled through the frame and screws (not shown) inserted through the holes and into the bar stock, or other known fastening means may be used. These screws or other fastening means are inserted at regular intervals along the length of the guide rail, such as at 18-inch intervals. The vertical guide rail slots 36 are continued into the housing 44 for the drive sprockets 16 and into the identical housing 44 for the idler sprockets 14, so that the guide rails 42 may extend along the housings 44 as well, providing a continuous guide surface along the entire length of the conveyor.

Each frame portion 22, 24 also has a horizontal guide slot 46 defined in the inwardly-facing side 48 of the frame portion 22, 24 adjacent to the upper surface 38. These horizontal guide slots 46 are rectangular and are at least as wide as they are tall. As shown in FIG. 3, these slots 46 are adapted to receive standard bar stock 50, which serves as an inexpensive horizontal guide surface for guiding along a downwardly projecting cam roller 52 on the underside of a pallet 54. Again, the guide material is fastened to the frame with screws or other known fastening means at regular intervals (not shown).

In the section of the conveyor shown in FIG. 3, an insert strip 55 has been placed between the rails 32 in both of the upper chambers 26. The insert strips 55 may be used in a part of the conveyor where better traction is required. These insert strips 55 contact the large central rollers 30 and are thick enough to lift the small side rollers 34 slightly off the rails 32, so that the chain 18, 20 is rolling along with the large rollers 30 supporting the weight of the product on the insert strip 55.

This gives a more positive drive and better traction than when the small rollers 34 are riding on the rails 32. At the same time, it carries the product along at a somewhat slower rate than when the small rollers 34 support the load, so it is generally used only when greater traction is required. With the design shown in these drawings, when the small rollers 34 support the load, they cause the large rollers 30 to rotate and carry the articles along at 2.5 times the chain speed. When the large rollers 30 carry the load, the products are carried at two times the chain speed.

The frame portions 22, 24 also have T-shaped slots 56 in their left, right, and lower surfaces for attaching items to the frame portions 22, 24, for attaching the frame portions 22, 24 to vertical supports 58, and so forth, by means of bolts with T-shaped heads (not shown but known in the art). The bottom surfaces of the frame members 22, 24 define left and right tubular slots 62 which have a rounded internal cross-sectional shape and which have an opening width 64 that is smaller than the diameter 66 of the rounded internal portion. These tubular slots 62 are intended to be used for receiving air hoses, wires, and other tubular-shaped items which run along the conveyor. The narrower opening 64 prevents these items from falling out of the slots 62 once they are inserted. It is also possible to use the tubular slots 62 to receive a downwardly-projecting guard sheet (not shown).

FIG. 2 shows two stop attachments 68 mounted opposite each other on the inside surfaces of the left and right frame portions 22, 24. Each of the stop attachments 68 includes an extruded, elongated frame 70 which defines an elongated hook 72 along its outer edge. The hook 72 fits into the upper inside T-slot 56 of the frame portion and hangs on the frame portion. The stop frame 70 also has T-shaped slots 56 in its lower surface. Preferably, an angle bracket (not shown) is mounted on each end of the stop frame 70 and receives T-shaped bolts, which fit into the T-shaped slots of the conveyor frame. If the sides of the pallets 54 extend past the sides of the left and right frames 24, 26, the stop frames 70 may be mounted on the outside of the frames 24, 26.

Figures 4, 5, 6:
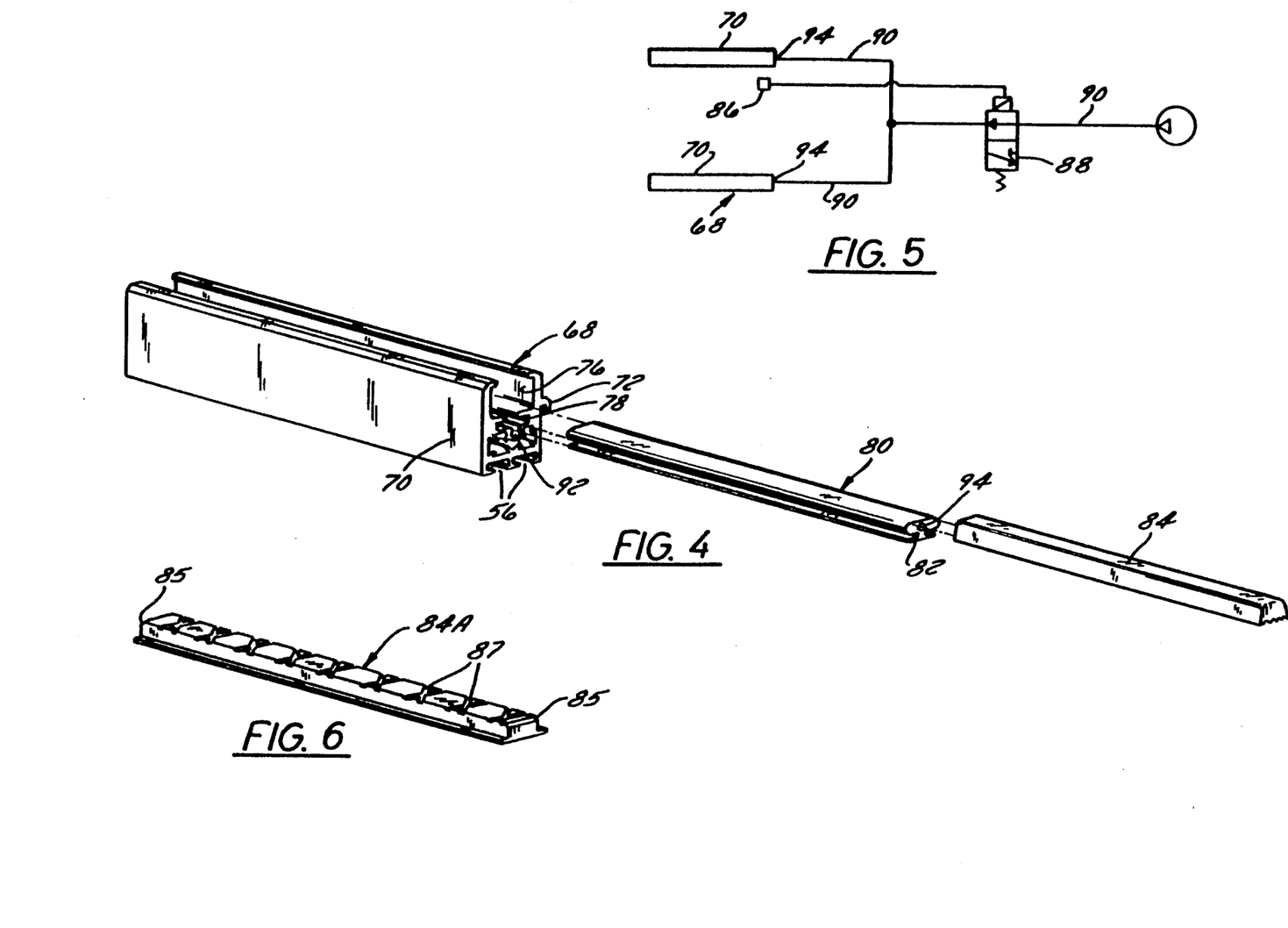
FIG. 4 is an exploded perspective view of one side of the stop mechanism shown in FIG. 2.
FIG. 5 is a schematic view of the control arrangement for the stop of FIG. 1.
FIG. 6 is an alternative embodiment of the stop tread of FIG. 4.

Each stop frame 70 defines an elongated bladder chamber 76 with a lower portion 78 having an inverted T-shaped cross-section. The stop chamber 76 is closed on the bottom and sides and open on the top, with the chamber tapering inwardly toward the top. An elongated bladder 80 with a bottom portion having an inverted T-shaped cross-section slides into the chamber 76 of the stop, with the T-shaped bottom 82 of the bladder 80 fitting into the T-shaped lower portion of the stop chamber 76. The main body of the bladder 80 projects above the T-shaped slot 78. A tread 84 lies in the stop chamber 76 on top of the bladder 80. The tread 84 shown in FIGS. 2 and 4 has a wide base and tapers upward, so that the upper portion of the tread 84 can project upwardly through the top opening of the stop frame, while the wide base portion is too wide to pass through the narrow top opening, thereby retaining the tread 84 on the stop frame 70. An alternative tread 84A is shown in FIG. 6. This tread 84A has a wide base and a rectangular cross-section upper portion. Again, the upper portion fits through the top opening of the bladder chamber 76 while the base is too wide to pass through the top opening of the bladder chamber and is thereby retained. The tread 84A also has chamfered forward and rear top edges 85 to provide a smooth transition from the stop to the conveyor chain. The tread 84A also has a tread design 87 molded into its top surface, which helps the tread 84A cut through oil and grease.

By using a tread member 84 or 84A which is separate from the bladder 80, the most suitable materials may be selected for the tread 84 and bladder 80, and materials may be changed from one application to another without changing the design. The bladder material should be something with high elasticity, while the tread material should be durable and have a high coefficient of friction.

FIG. 5 shows the control mechanism for the stops. A sensor 86 senses the presence of a pallet over the stop mechanism. This causes the valve 88 to be moved to the position shown in FIG. 5, with pressurized air entering the parallel bladders 80 causing the treads 84 to shift upwardly, lifting the pallet up off of the frames 24, 26. To release the pallet, the valve 88 is shifted to its second position, shutting off communication with the pressurized air source and permitting the air to be vented from the bladders 80 to the atmosphere. The bladders 80 preferably have a total travel of about ⅜ of an inch, so that the tread 84 normally lies ⅛ inch below the top of the large rollers 30, and, when the bladders 80 are inflated, the tread 84 lies ¼ inch above the top of the large rollers 30. In any case, the bladders 80 should at least have ¼ inch of travel. The air hoses 90 which control the bladders 80 run in the tubular slots 62 of the frame portions 22, 24 and in the circular recess 92 of the stop frame 70. The hoses 90 terminate at the respective openings 94 in the bladders 80 with a sealed fit.

Figure 1:
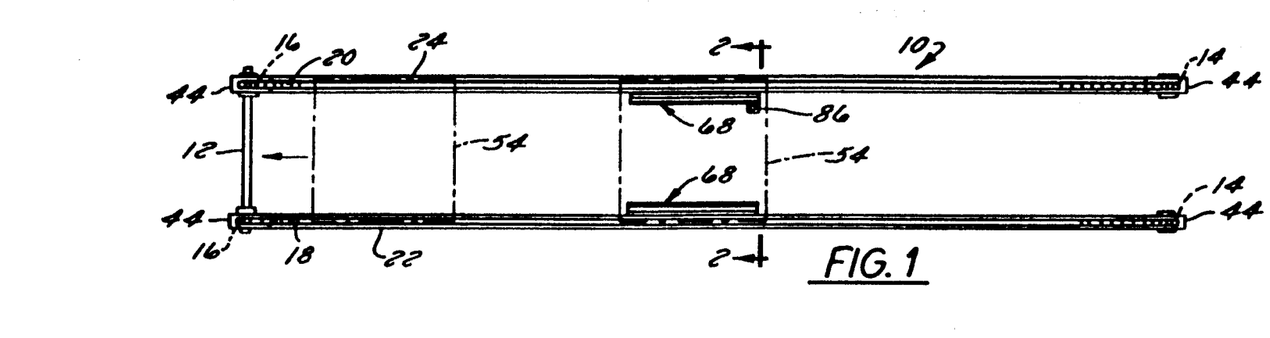
FIG. 1 is a schematic top view of a conveyor made in accordance with the present invention.

As shown in FIG. 1, a pallet starts out on the right of the conveyor, moves to the left until it reaches the stop 68, and then, if the stop 68 is triggered, the pallet 54 is lifted up off the conveyor. When the stop is released, the weight of the pallet 54 pushes the air out of the bladder 80, putting the pallet 54 back down on the moving roller chains 18, 20 so it can be carried off to the left, as shown.

Figures 11, 12:
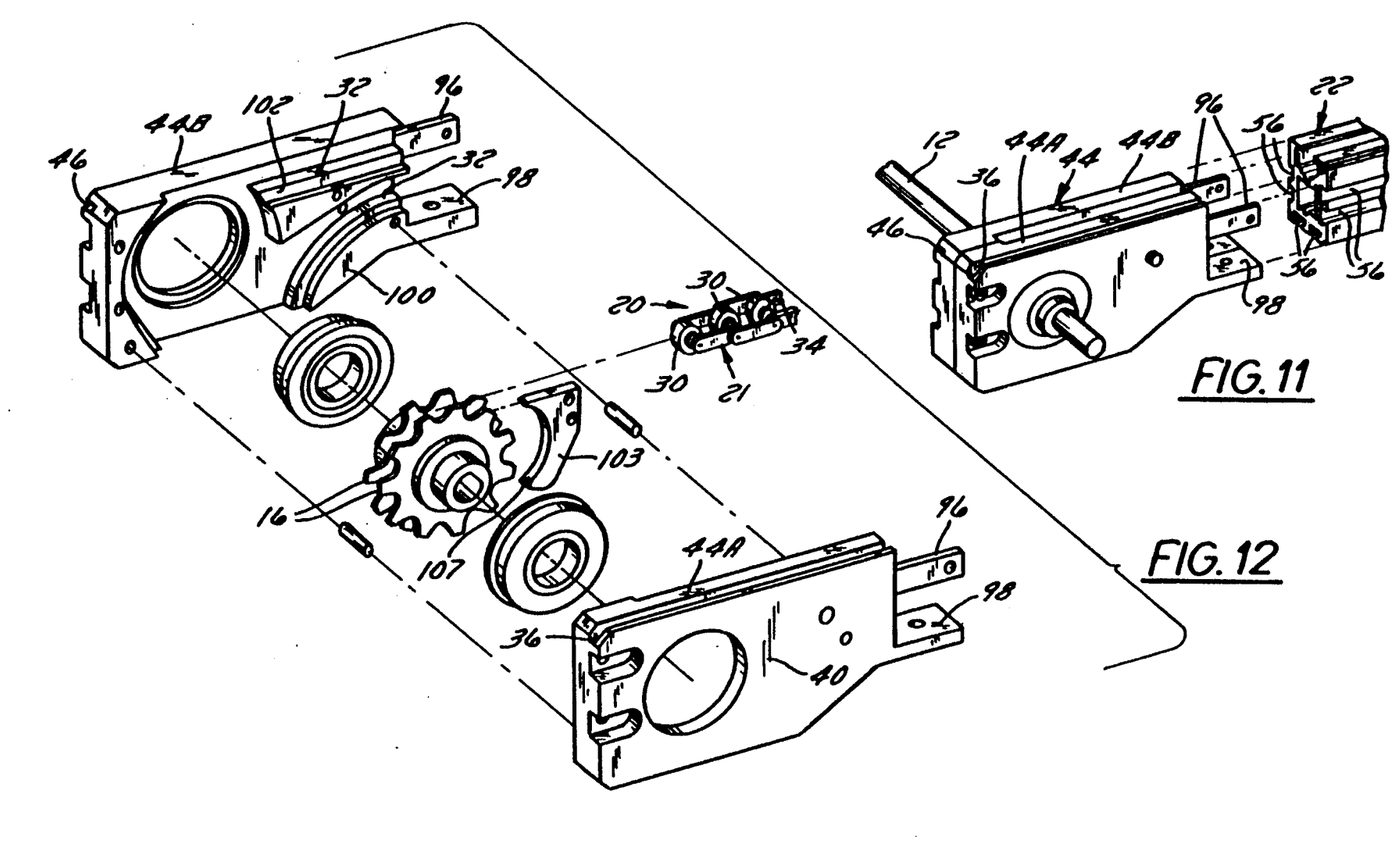
FIG. 11 is a perspective view of the drive portion of one side of the conveyor shown in FIG. 1 with the drive portion exploded away.
FIG. 12 is an exploded perspective view of the drive portion of FIG. 11.

Referring to FIGS. 11 and 12, the sprocket housings 44 at each end of the conveyor 10 are identical to each other and are made to conform to the shape of the frames 22, 24. The housings 44 include side projections 96 which extend into the side T-slots 56 on the frame members and have holes for receiving T-bolts to lock the housings 44 on the frames 22, 24. The housings 44 also include lower projections 98 which lie below the frame 22, 24 and have holes that align with the T-slots in the bottom of the frame 22, 24.

The inner surfaces of the housings 44 continue the horizontal guide slot 46 of the frame, so that horizontal guides can extend almost to the end of the conveyor. The upper surfaces of the housings 44 continue the vertical guide slot 36 of the frame, so that vertical guides can extend the entire length of the conveyor.

Inside the housings 44 are chain guides 100, 102 which provide rails 32 for receiving the small side rollers 34 while enclosing all but the top surface of the chain on its upper run. The idler sprockets 14, and drive sprockets 16 are double sprockets, adapted to straddle the center roller 30 and contact the small side rollers 34.

Figure 13:
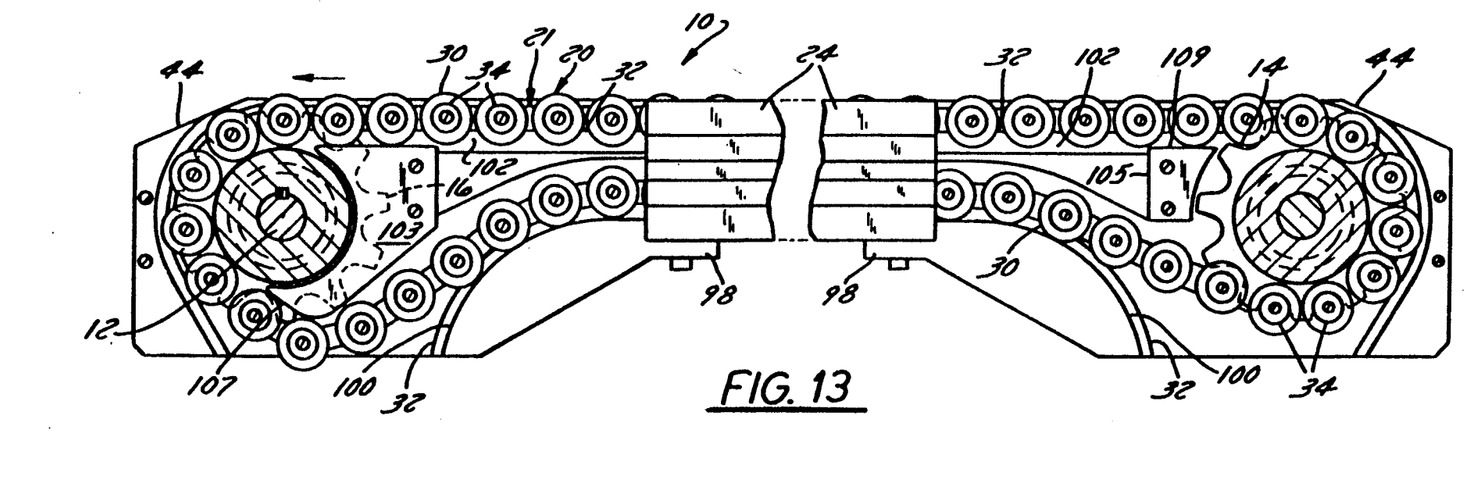
FIG. 13 is a schematic side sectional view of the conveyor of FIG. 1, showing the drive end and the idler end.

As shown in FIG. 13, there is a drive sprocket chain stripper 103 in the housing 44 for the drive sprockets 16, which sits between the sprockets 16 and is bolted to the housing 44. The drive sprocket chain stripper 103 provides a guide surface 107 for peeling the chain 18 or 20 off of the drive sprockets 16. In the prior art, it was necessary to make the chain very long so that a long loop of chain (a catenary) extended from the drive sprockets 16 toward the floor in order to prevent the chain from trying to wrap up on the sprockets 16. The drive sprocket chain stripper 103 permits the chain to be just long enough to go around the drive sprockets 16 and the idler sprockets 14 and eliminates that catenary chain.

There is also an idler sprocket chain stripper 105 in the housing 44 at the idler end of the conveyor, which keeps the chain in line as it goes over the top of the idler sprockets 14. The idler sprocket chain stripper 105 sits between the idler sprockets 14 in the housing 44 and is bolted to the housing. It provides a guide surface 109 which guides the chain 18 or 20 from the idler sprockets 14 onto the rails 32 of the frame 22 or 24. The two housing halves 44A, 44B are bolted together in both the idler sprocket housing and the drive sprocket housing.

Figure 7:
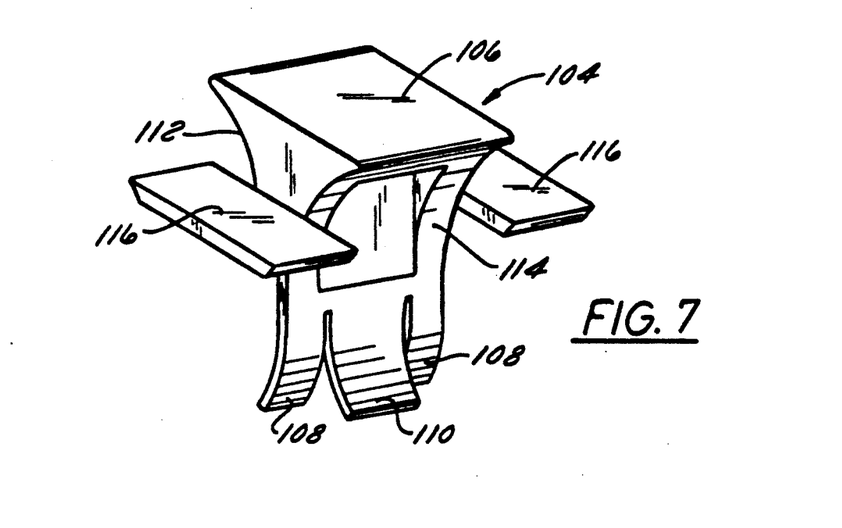
FIG. 7 is an enlarged perspective view of a clip which is used in the chain of the conveyor of FIG. 1.
Figure 8:
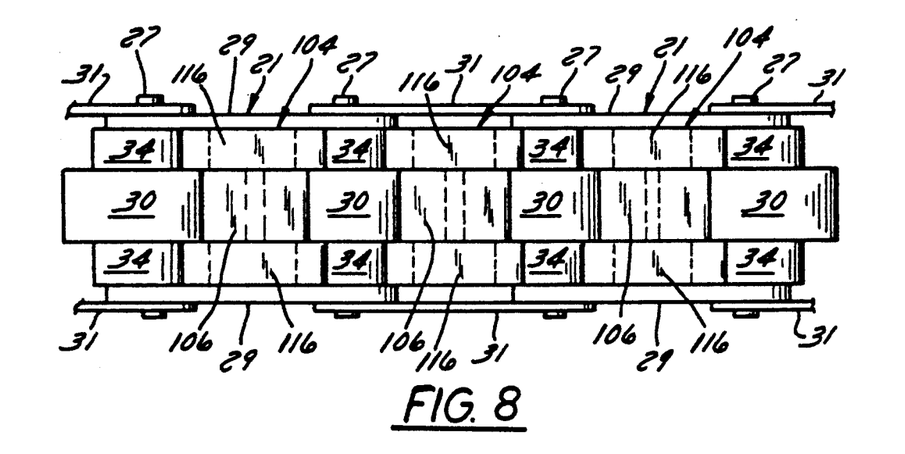
FIG. 8 is a broken-away top view of the chain of the conveyor of FIG. 1, with the clips of FIG. 7 installed on the chain.
Figure 9:
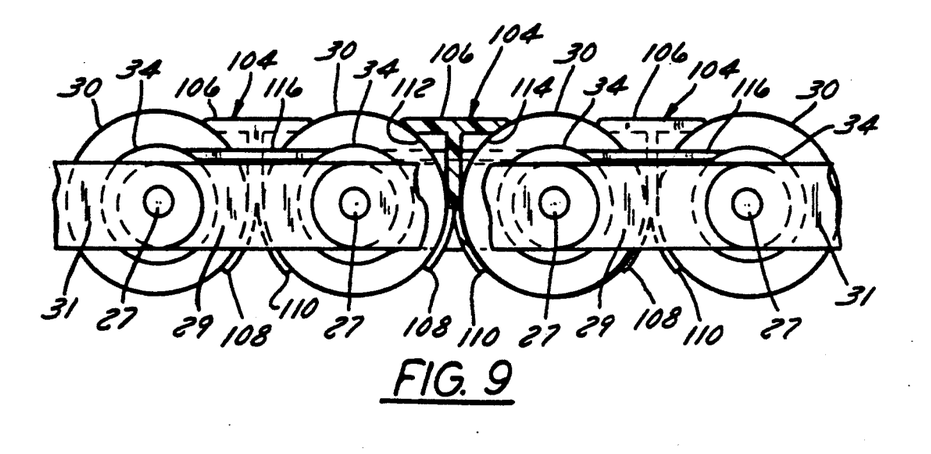
FIG. 9 is a side sectional view of the chain shown in FIG. 8.

Clips 104, as shown in FIG. 7, are inserted between adjacent large rollers 30 in order to prevent debris from entering the spaces in the chains 18, 20 and jamming the rollers. The clips 104 have a flat top surface 106 with three downwardly-projecting legs 108, 110. The outer legs 108 curve forward, and the inner leg 110 curves backward. Between the top surface 106 and the legs 108, 110 are curved forward and rear sides 112, 114, respectively. The curved forward side 112 and forward leg 108 wrap partially around the forward large central roller 30 with a clearance fit, and the curved rear side 114 and rear legs 110 wrap partially around the rear large central roller 30 with a clearance fit. From the point where the top surface 106 of the clip touches the roller 30 to the bottom of the legs 108, 110 covers approximately 45 degrees (or one-fourth of the circumference) of the roller. The front-to-back length of the top surface 106 of the clip 104 is short enough that it permits a portion of the center roller 30 to project above the clip 104 to carry the pallets but long enough that it rests on the large central rollers 30 at both ends. The front-to-back length of the clip top 106 must be less than the center-to-center distance between the forward and rear rollers. When an article is carried on top of the center rollers 30, that article does not touch the clips 104, which lie below.

The width of the flat top surface 106 is the same as the width of the central roller 30. The clip 104 also has two flat wings 116 projecting outwardly at a lower height than the top surface 106 to cover the gap between the two adjacent small side rollers 34. The wings 116 are longer than the top surface 106 in order for the front and back of each wing to span the gap between its respective front and rear small roller 34. The wings 116 are approximately the same width as the small side rollers. By closing off the gaps in the chain, the clips 104 prevent debris from falling down into the chain, thereby eliminating a serious problem with roller chains.

In order to install the clips 104 on the chain, the bottoms of the front and rear legs 108, 110 are squeezed together, until the legs 108, 110 can fit through the narrowest portion of the gap between adjacent rollers 30. Then, the legs 108, 110 snap back to their original shape, wrapping around the front and rear adjacent rollers 30 with a clearance fit so that they do not interfere with the rotation of the rollers but are retained on the chain.

Figure 16:
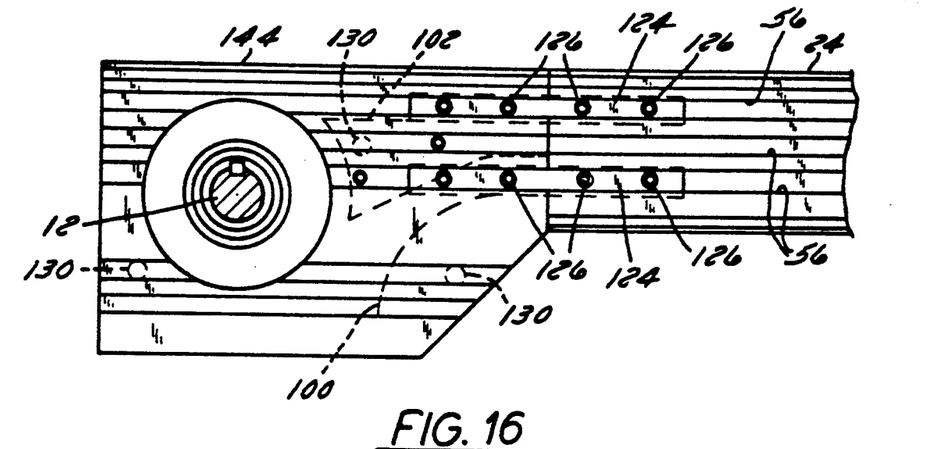
FIG. 16 is a right side view of the drive of FIG. 13.
Figure 17:
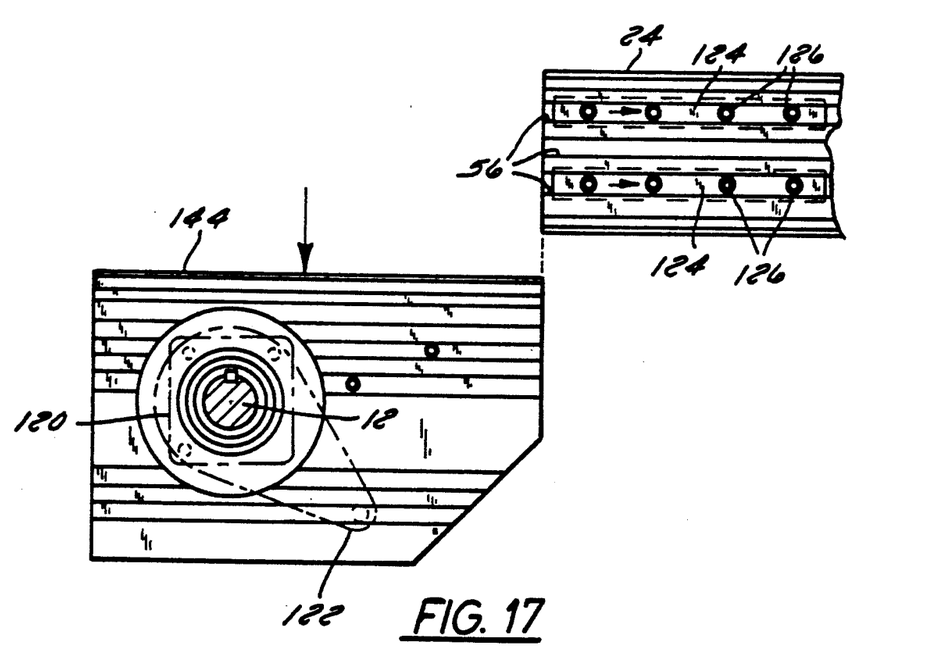
FIG. 17 is a right side view of the drive of FIG. 13, with a drive gear box installed on the outside of the drive housing and with the drive housing removed from the conveyor frame.

The drive housings 144 shown in FIGS. 14, 16, 17, and 19 are substantially identical to the drive housing 44 shown in FIGS. 11 and 12, except that they include T-slots 56A which are aligned with the T-slots 56 in the frame members 22, 24, and T-slots 57, which are used for mounting a gearmotor drive 120. They do not include the projections 96 which are on the housings 44. As is shown in FIG. 17, the gearmotor drive 120 is mounted on the outside of the right drive housing 144. The gearmotor drive 120 is simply slid over the keyed drive shaft 12, and the torque arm 122 of the drive 120 is mounted to one of the T-slots 57 by means of a screw in order to prevent the drive 120 from spinning relative to the drive housing 144. This means that the gearmotor drive 120 can be removed by removing a single screw or bolt. The gearmotor drive 120 could alternatively be mounted on the other side of the right drive housing 144 or on either side of the left drive housing 144, depending on which location is most convenient.

Figures 14, 15:
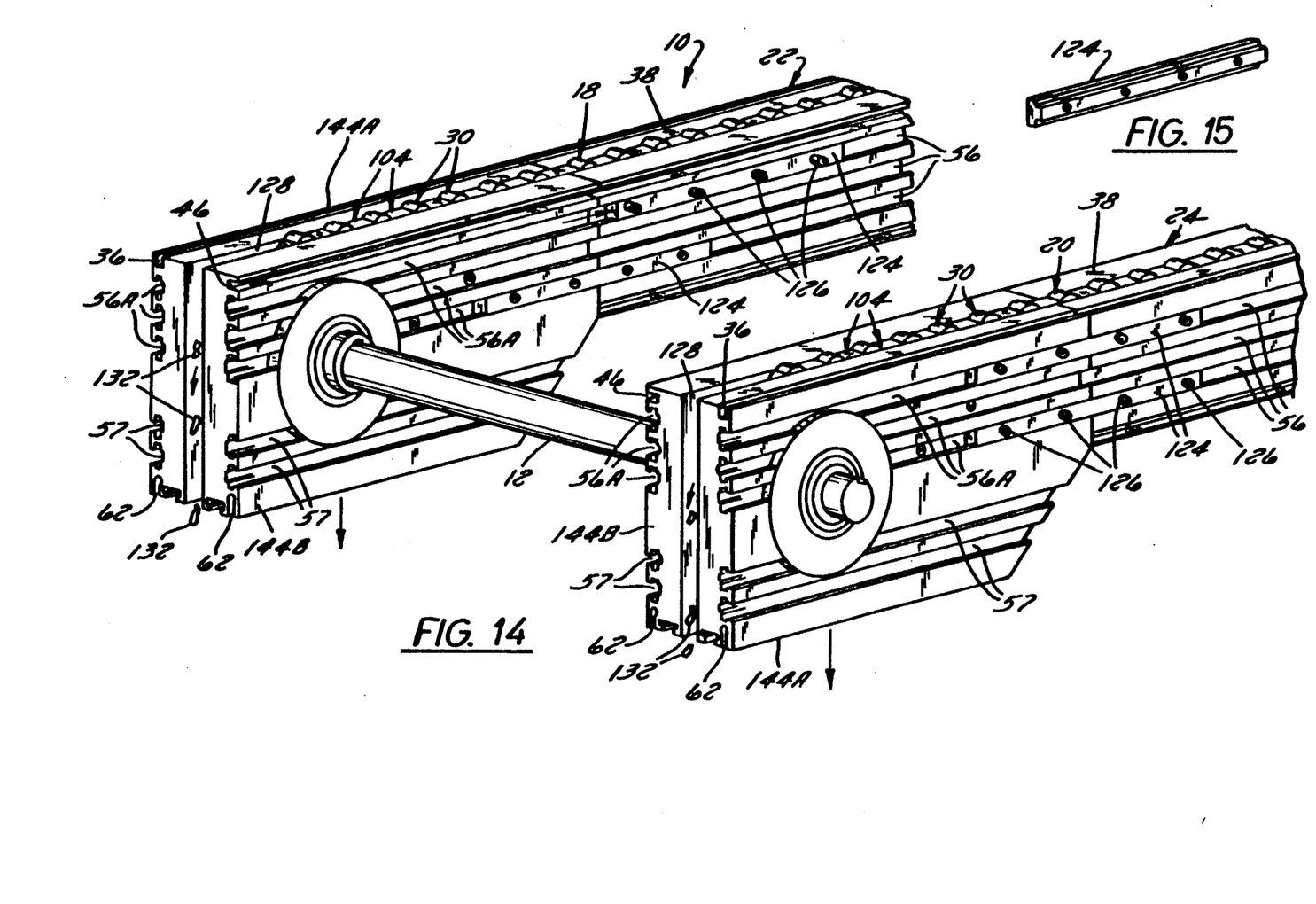
FIG. 14 is a perspective view of an alternative embodiment of the drive end of the conveyor.
FIG. 15 is a perspective view of one of the connector strips which connects the drive housing of FIG. 14 to the conveyor frame.

The drive housings 144 are mounted to their respective frame members 22, 24 by means of mounting strips 124. The mounting strips 124 may have a T-shaped cross-section conforming to the cross-section of the T-shaped slots 56, 56A, or they may simply be flat strips (not shown). The mounting strips 124 are slid into their respective T-slots 56 or 56A, the drive housings 144 are aligned with their respective frame members 22, 24 until the respective T-slots 56 and 56A are aligned with each other, and the mounting strips 124 are then slid so that they bridge the gap between the respective frame member 22, 24 and drive housing 144. With the connecting strips 124 extending into the housing 144 and into the respective frame member 22, 24, so as to align the housing and frame member with each other, the set screws 126 are tightened, wedging the connecting strips 124 in place against the T-slots, thereby mounting the drive housings 144 on their respective frame members 22, 24.

To install or remove the drive housing 144 from its respective frame member 22, 24, the drive housing 144 can be moved vertically into or out of position, as shown by the arrows in FIGS. 14 and 17. This means that the drive housings 144 can be installed and removed without any horizontal clearance at the end of the conveyor.

As shown in FIG. 16, the two housing halves 144A and 144B are connected together at three points 130, and there are spacers at each of the connection points 130, so as to maintain a gap between the left and right housing halves 144A and 144B. Where the chain passes over the drive sprocket 16, there is an unobstructed vertical gap 128 between the left and right housing portions 144A and 144B, which permits debris 132 to fall off the chain 18, 20, through the gap 128, and out of the housing 144.

Figure 18:
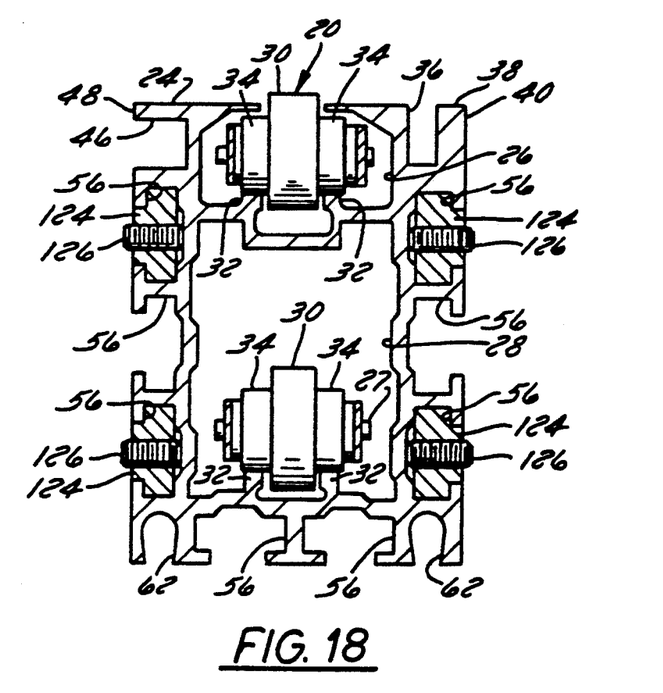
FIG. 18 is a sectional view through the portion of the conveyor frame shown in FIG. 14.
Figure 19:
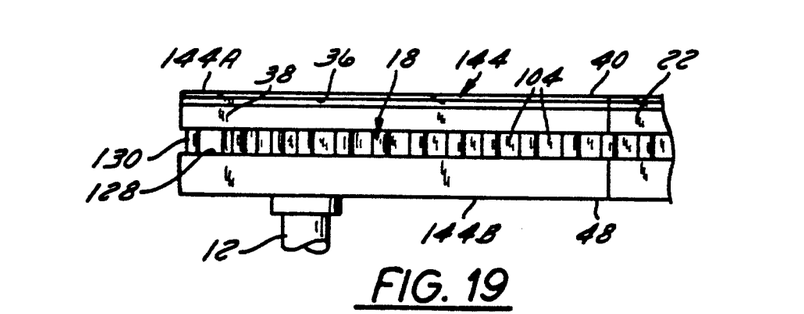
FIG. 19 is a top view of the drive shown in FIG. 14.

FIG. 16 shows that this alternative drive housing 144 includes the same chain guides 100, 102 and stripper 103 as the drive housing shown in FIGS. 11 and 12. FIG. 18 shows a cross-sectional view of the right frame member 24 with the connector strips 124 located in the T-slots 56. FIG. 19 shows a top view of the drive 144 mounted on the left frame member 22.

In this alternative embodiment, the idler housings (not shown) are identical to the drive housings 144, except that no drive shaft passes through them, and no gear drive is mounted on them. The idler housings also can be installed and removed with only vertical movement, requiring no horizontal clearance.

It will be obvious to those skilled in the art that modifications may be made to the embodiment described above without departing from the scope of the present invention.

What is claimed is:

1. A conveyor frame for a chain-driven conveyor, comprising:

an elongated frame member, defining parallel, elongated upper and lower chambers, each of said chambers including a pair of rails for receiving a chain, and each of said chambers defining left and right sides, a top, and a bottom, wherein the top of said upper chamber defines an elongated opening;

and wherein said frame member defines at least one elongated guide-receiving slot which opens outwardly from either its top or one of its sides, said guide-receiving slot having a substantially rectangular cross-section with a length in the direction in which it opens and a width at substantially right angles to the length, with the length being at least equal to the width, said guide-receiving slot being adapted to receive an off-the-shelf piece of sheet material to be used as a guide for guiding products as they are carried along the conveyor;

and further comprising a drive housing for enclosing the drive shaft and drive sprocket of the conveyor, said housing having a top and left and right sides aligned with the top and left and right sides of said conveyor frame and defining a guide-receiving slot which is aligned with the guide-receiving slot of said frame member.

2. A conveyor frame as recited in claim 1, wherein said frame member defines an elongated T-shaped cross-section slot in its side, and wherein said drive housing defines an elongated T-shaped cross-section slot in line with the corresponding slot in said frame member.

3. A conveyor frame as recited in claim 2, wherein said frame member and said drive housing each define at least two of said T-shaped cross-section elongated slots in their left side and at least two of said T-shaped cross-section elongated slots in their right side, with the slots in the frame member being aligned with the corresponding slots in the drive housing.

4. A conveyor frame as recited in claim 2, and further comprising a connector strip which lies in the T-shaped cross-section slot of said frame member and in the corresponding T-shaped cross-section slot of said drive housing, so as to connect the frame member and drive housing together and keep them in alignment and such that, if said connector strip is slid away from the joint between said frame member and said drive housing, said drive housing may be moved vertically in order to remove said drive housing from said frame member.

5. A conveyor frame as recited in claim 4, wherein said connector strip defines holes which receive screws to fasten said connector strip to said housing and to said frame member.

6. A conveyor frame as recited in claim 3, wherein each of the two sets of left elongated T-shaped slots and each of the two sets of right elongated T-shaped slots receive a connector strip which extends into the conveyor frame member and the drive housing so as to connect the frame member and drive housing together and keep them in alignment and such that, when said connector strips are slid away from the joint between said frame member and said drive housing, the drive housing can be moved vertically to be disengaged from the frame member.

7. A conveyor, comprising:
 a frame member, defining left, right, and top surfaces and defining at least one elongated, T-shaped slot in its left and right surfaces;
 a drive housing, defining left, right, and top surfaces aligned with the left, right, and top surfaces of said frame member and defining at least one elongated, T-shaped slot in its left and right surfaces, said left and right T-shaped slots in said drive housing being aligned with the corresponding left and right T-shaped slots in said frame member to form two pairs of aligned T-shaped slots; and
 a connector member for each of said pairs of aligned, T-shaped slots, each connector member being adapted to slide along its respective slot so as to extend into the corresponding T-shaped slots in the drive housing and the frame member, connecting those members together and keeping them in alignment.

8. A conveyor as recited in claim 7, wherein said drive housing includes left and right housing members; and further comprising:
 a drive sprocket contained inside said housing and lying completely inside said top, left and right surfaces of said drive housing; and
wherein said drive housing defines a vertical gap between said left and right housing members such that, when a chain passes over said drive sprocket, debris on the chain can fall through said vertical gap.

9. A conveyor as recited in claim 8, and further comprising mounting means for receiving a drive gearbox on said drive housing, wherein said mounting means provides the option of mounting said said drive gearbox on either the left housing member or the right housing member.

10. A conveyor as recited in claim 9, and further comprising a drive gearbox mounted on said drive housing.

11. A conveyor, comprising:
 a conveyor frame, defining a top surface and left and right side surfaces;
 a drive housing having a top surface and left and right outer side surfaces;
 said drive housing being mounted on said conveyor frame such that said drive housing can be installed on and removed from said conveyor frame by moving solely in a vertical direction and such that the outer left side surface of said drive housing is in line with the left side surface of said conveyor frame; the outer right side surface of said drive housing is in line with the right side surface of said conveyor frame; and the top surface of said housing is in line with the top surface of said conveyor frame.

12. A conveyor as recited in claim 11, and further comprising:
 a gear drive mounted on said drive housing such that it can be removed from said housing by removing only a single bolt from the housing.

* * * * *

UNITED STATES PATENT AND TRADEMARK OFFICE
CERTIFICATE OF CORRECTION

PATENT NO. : 5,311,983

DATED : May 17, 1994

INVENTOR(S) : Robert T. Clopton

It is certified that error appears in the above-identified patent and that said Letters Patent is hereby corrected as shown below:

Column 3, line 45, delete "0" before --bar--.

Signed and Sealed this

Sixteenth Day of August, 1994

Attest:

BRUCE LEHMAN

*Attesting Officer*        *Commissioner of Patents and Trademarks*